United States Patent Office 3,471,563
Patented Oct. 7, 1969

3,471,563
HYDROGENATION OF ADIPONITRILE OVER ALKALI MODERATED RUTHENIUM
Loren D. Brake, Wilmington, Del., assignor to E. I. du Pont de Nemours and Company, Wilmington, Del., a corporation of Delaware
No Drawing. Continuation-in-part of applications Ser. No. 587,981, Oct. 20, 1966, and Ser. No. 516,083, Dec. 23, 1965. This application May 17, 1968, Ser. No. 729,881.
Int. Cl. C07c 85/12
U.S. Cl. 260—583                6 Claims

ABSTRACT OF THE DISCLOSURE

Hexamethylene diamine is prepared by reducing adiponitrile at a hydrogen partial pressure of at least 300 pounds per square inch and a total pressure of 300 to 15,000 pounds per square inch and a temperature of from 50 to 250 in the presence of ammonia and in the presence of from 0.001 to 10 percent by weight of ruthenium catalyst calculated as metallic ruthenium and based on the weight of adiponitrile, the ruthenium being supported on an inert carrier and being alkali moderated with from 0.1 to 15 percent by weight of an alkali metal compound calculated as the alkali metal.

Cross-reference to related applications

This application is a continuation-in-part of my copending application Ser. No. 587,981 filed Oct. 20, 1966, and my copending application Ser. No. 516,083 filed Dec. 23, 1965, now abandoned.

Background of the invention

This invention relates to a method of hydrogenating organic compounds which contain a nitrogen atom directly attached to a carbon atom, and more particularly is directed to an improvement in the method of reducing adiponitrile by heating it in the presence of hydrogen and the presence of ammonia, the improvement comprising heating to a temperature of from 50 to 250° C. in the presence of an alkali moderated supported ruthenium catalyst. By this method the adiponitrile is converted to hexamethylenediamine, in good yield with a minimum production of by-products.

Adiponitrile, also known as adipyl dinitrile and tetramethylene dicyanide has the chemical structure

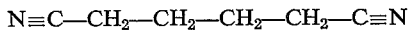

N≡C—CH₂—CH₂—CH₂—CH₂—C≡N

The various methods known to the art for hydrogenating organic nitrile compounds tend to involve a variety of problems. The most often occurring problems are low yields and the production of by-product tars and condensation products produced by deamination during hydrogenation.

One method for liquid phase hydrogenation of adiponitrile discloses carrying out the reaction in the presense of a concentrated aqueous solution of a strong base, see U.S. Patent No. 2,449,036. However, the reaction is carried out using a cobalt or nickel catalyst at temperatures below 100° C. and as a result require long reaction times and result in considerable by-product formation.

I have discovered a method of reducing adiponitrile which results in good conversion and good yields with only insignificant amounts of unwanted by-products especially hexamethyleneimine, bis-hexamethylenetriamine, tars and other residues.

Summary of the invention

In summary this invention is directed to an improvement in the liquid phase hydrogenation of adiponitrile by heating it at hydrogen partial pressure of at least 300 pounds per square inch and a total pressure of from 300 to 15,000 pounds per square inch in the presence of from less than 1% to more than 200% of ammonia based on the weight of adiponitrile, the improvement comprising carrying out the reaction at a temperature of from 50 to 250° C. in the presence of from 0.001 to 10 percent by weight of an alkali moderated ruthenium catalyst, based on the weight of adiponitrile and calculated as metallic ruthenium, said catalyst being supported on an inert carrier material and being moderated with from 0.1 to 15 percent by weight of a basic alkali metal compound calculated as the alkali metal.

By this method adiponitrile is converted to hexamethylenediamine in a short time and in good yields, with minimum production of hexamethyleneimine, bishexamethylenetriamine, unwanted tars, and other condensation by-products.

Description of the invention

I have discovered an improved method for hydrogenating adiponitrile by subjecting it to a hydrogen partial pressure of at least 300 pounds per square inch and a total pressure of 300 to 15,000 pounds per square inch, in the presence of from less than 1 to more than 200 percent of ammonia based on the weight of adiponitrile, the improvement comprising carrying out the reaction at a temperature of from 50 to 250° C. in the presence of from 0.001 to 10%, based on the weight of adiponitrile and calculated as metallic ruthenium, of an alkali moderated ruthenium catalyst supported on an inert carrier.

Surprisingly, this process attains good conversions and good yields in reaction times of less than 60 minutes, often in as short a time as 1 to 30 minutes. As a result this process is characterized by production of minimal amounts of hexamethyleneimine, bis-hexamethylenetriamine, unwanted by-product tars and other residues. Moreover, this process can be run repeatedly over the same alkali moderated catalyst with the above attendant advantages, without retreating the catalyst.

Apart from the critical conditions of alkali moderated ruthenium catalyst supported on an inert carrier, and temperature, the other general reaction conditions can be those known in the art, and described in detail for example in Grunfeld, U.S. Patent 2,449,036, the disclosure of which is incorporated herein by reference.

As stated previously, the ruthenium catalysts suitable for use in the process of this invention are supported on an inert carrier. Suitable inert carriers are described in chapter 7 of Catalysis by S. Berkman, J. C. Morrell, and G. Egloff, Reinhold Publishing Corp., New York, (1940) or chapter 6 of Catalysis Vol. 1 by P. H. Emmet, Reinhold Publishing Corp., New York, (1940). Representative of such carriers are carbon, calcium carbonate, rare earth oxides, rare earth carbonates, mixed rare earth oxide-carbonates, alumina, barium sulfate, kieselguhr, pumice, diaspore, bauxite, periclase, zirconia, titania, diatomaceous earth, calcium sulfate, calcium oxide, barium oxide, barium carbonate, strontium carbonate, strontium oxide, strontium sulfate, silica, silica-alumina, etched nickel, Nichrome and Inconel wire. Preferred catalyst supports are alumina, kieselguhr, barium sulfate, carbon, calcium carbonate, rare earth oxides, rare earth carbonates and mixed rare earth oxide-carbonates. The most preferred support materials are alumina, barium sulfate and kieselguhr.

Alkali moderation of the catalysts consists of associating a basic alkali metal compound with the catalyst.

Preferred basic alkali metal compounds are lithium, cesium, rubidium, sodium and potassium hydroxide, carbonate, bicarbonate, methoxide, ethoxide, propoxide, t-butoxide, and other alkoxides and sodamide. The most preferred compounds are the hydroxides, carbonates, bicarbonates and alkoxides of sodium and potassium, lithium methoxide and sodamide.

Alkali moderation can be accomplished by depositing a ruthenium compound on a support from an aqueous solution of sodium or potassium bicarbonate as disclosed in copending application Ser. No. 516,094, filed Dec. 23, 1965, now abandoned, or by treating a supported ruthenium catalyst prior to reduction with dilute sodium or potassium hydroxide as disclosed in copending application Ser. No. 516,109, filed Dec. 23, 1965, now abandoned, or by treating a supported ruthenium catalyst after reduction, such as in situ treatment of the catalyst with sodium, lithium or potassium methoxide during a hydrogenation reaction as disclosed in copending application Ser. No. 516,084, filed Dec. 23, 1965, now abandoned.

Extent of alkali moderation can be determined by analysis of the treated catalyst for alkali metal content using any conventional analytical means such as atomic adsorption spectrophotometry. Thus, for example, if a catalyst analyses 5 weight percent sodium, it is considered to be alkali moderated to the extent of 5%. The extent of alkali moderation can range from 0.1% up to 15%, depending to some degree on the support. An alumina support for example, will associate to a greater degree with a basic alkali metal compound than will be barium sulfate support. It is preferred that the extent of alkali moderation lie in the range of 0.3% to 10% by weight.

The amount of alkali activated supported ruthenium catalyst used will be at least 0.001% by weight of the adiponitrile used, calculated as metallic ruthenium. The catalyst can be used in amounts of up to 10% or more, but little practical advantage is gained from the use of larger amounts. Preferably, from about 0.05 to 1.0% by weight of catalyst, calculated as metallic ruthenium, will give desired reactions at reasonable cost.

Hydrogenation of adiponitrile is ordinarily conducted in the presence of amounts of ammonia of from less than 1 to about 200% based on the weight of adiponitrile. Amounts of 5 to 40% are preferred, and yet there appears to be no upper limit to the amount of ammonia which can be present without deleterious effect on the process. Amounts as high as 400% and higher can be used.

The reaction temperature used in this invention will be in the range of from about 50° to 250° C., and is preferably about 120° to 200° C.

The process is run at hydrogen partial pressure above about 300 pounds per square inch, ordinarily above 500 p.s.i. and preferably between about 2000 and 5500 p.s.i. Higher hydrogen partial pressures can be used if desired but little practical advantage is obtained. The total pressure during hydrogenation will ordinarily be above 300–500 p.s.i. and can be as high as 15,000 p.s.i., a practical upper limit for reasons of cost of operation and equipment.

The process of this invention can be run in the presence or absence of a solvent. When a solvent is to be used in the process of this invention, suitable ones include liquids not subject to hydrogenation under the conditions employed. Representative of the suitable solvents are saturated aliphatic and alicyclic hydrocarbons such as methyl alcohol, ethyl alcohol, isopropyl alcohol, n-butanol, and preferably the aliphatic and alicyclic hydrocarbon ethers, such as n-propyl ether, n-butyl ether, ethyl ether, isopropyl ether, isobutyl ether, the amyl ethers, tetrahydrofuran, dioxalane, dioxane, di-isopropyl ether, dicyclohexyl ether, and others. Water can also be used as a solvent as can mixtures of two or more of the above solvents.

When a solvent is used, it can be used in concentrations as low as about 0.2 part of solvent per part of adiponitrile introduced into the reaction. However, amounts of solvent from about 25% to 150% of the weight of adiponitrile will normally be used. Greater amounts of solvent can of course be used, even as high as 1000% to 2000% based on the adiponitrile, but such amounts merely dilute the reactants with no particular advantages obtained.

It will be noted that an important advantage of the invention is the short reaction period which contributes materially to the prevention of product decomposition generally associated with the elevated temperatures employed. Surprisingly, this advantage can be achieved by the present invention without the low conversions which have been characteristic of prior processes using short reaction times.

The process of this invention can be run on a batch or continuous basis. In a continuous operation the adiponitrile is fed in a continuous stream into a suitable pressure vessel where it is subjected to the hydrogenation conditions of this invention. Hydrogenated hexamethylenediamine is drawn off continuously and recovered as described above. As will be understood by those skilled in the art, extensive back-mixing ordinarily occurring in continuous processes will necessitate a greater residence time for the adiponitrile in the hydrogenation atmosphere and will involve a different calculation to determine the quantity of catalyst used. However, the conditions still fall within the ranges described above for batch processes.

This invention will be better understood by reference to the following illustrative example wherein parts and percentages are by weight.

Example 1

At a temperature of 150° C. and a hydrogen pressure of 2500 pounds per square inch gage in a suitable pressure vessel, 400 parts of adiponitrile, 50 parts of ammonia, and 4.6 parts of 50% aqueous potassium hydroxide are subjected to hydrogenation over 20 parts of a finely divided catalyst comprising about 5% ruthenium on alumina for a period of 30 minutes. The resulting mixture is freed of catalyst by filtration and distilled. Final distillation under vacuum gives hexamethylenediamine in an amount equal to a yield of 97.5% based on the amount of adiponitrile introduced into the process.

Example 1 can be repeated substituting for the potassium hydroxide the alkali metal compound listed below in the amount indicated. Similar results to those of Example 1 are obtained.

| Alkali metal compound: | Amount |
| --- | --- |
| Potassium methoxide | 20 parts of 10% solution in methanol. |
| Sodamide | 2.5 parts. |
| Potassium tert-butoxide | 4 parts. |
| Sodium hydroxide | 1.50 part of 50% aqueous solution. |
| Sodium methoxide | 6 parts. |

I claim:
1. In a process for the hydrogenation of adiponitrile comprising admixing adiponitrile with hydrogen at a pressure of from 300 to 15,000 pounds per square inch, in the presence of from about 1 to 200% of ammonia based on the weight of adiponitrile, the improvements comprising carrying out the process at a temperature of from 50 to 250° C., and in the presence of from 0.001 to 10% based on the weight of adiponitrile and calculated as ruthenium metal, of ruthenium catalyst supported on an inert carrier, said supported catalyst being alkali moderated with from 0.1 to 15% of a basic alkali metal compound calculated as the alkali metal.

2. The process of claim 1 wherein said process is carried out in an inert liquid solvent.

3. The process of claim 1 in which the basic alkali metal compound is selected from the group consisting of the hydroxides, carbonates, bicarbonates and alkoxides of sodium and potassium, lithium methoxide and sodamide.

4. The process of claim 1 wherein the catalyst is supported on an inert carrier selected from the group consisting of alumina, barium sulfate and kieselguhr.

5. The process of claim 1 in which the catalyst is moderated with a basic alkali metal compound selected from the group consisting of sodium carbonate, sodium methoxide, sodium hydroxide and potassium hydroxide.

6. The process of claim 1 in which the reaction temperature is between 120 and 200° C.

References Cited

UNITED STATES PATENTS 3,372,195   3/1968   Little.

CHARLES B. PARKER, Primary Examiner

R. L. RAYMOND, Assistant Examiner

U.S. Cl. X.R.

252—472; 260—690